US011245642B2

(12) United States Patent
Aharonov et al.

(10) Patent No.: US 11,245,642 B2
(45) Date of Patent: *Feb. 8, 2022

(54) PROVIDING AN OPTIMAL RESOURCE TO A CLIENT COMPUTER VIA INTERACTIVE DIALOG

(71) Applicant: International Business Machines Corporation, Armonk, NY (US)

(72) Inventors: Rotem Aharonov, Kiryat-Motzkin (IL); Salil Ahuja, Madison, WI (US); Rama K. T. Akkiraju, Cupertino (CA); David Amid, Modiin (IL); Ateret Anaby-Tavor, Givat Ada (IL); Jason M. Leonard, Beaumaris (AU); Mitchell Mason, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/872,150

(22) Filed: May 11, 2020

(65) Prior Publication Data

US 2020/0274824 A1 Aug. 27, 2020

Related U.S. Application Data

(63) Continuation of application No. 15/141,889, filed on Apr. 29, 2016, now Pat. No. 10,735,348.

(51) Int. Cl.
*H04L 12/911* (2013.01)
*H04L 29/06* (2006.01)
(Continued)

(52) U.S. Cl.
CPC .............. *H04L 47/822* (2013.01); *G06F 8/61* (2013.01); *G06F 8/65* (2013.01); *G06F 9/5044* (2013.01); *H04L 67/2809* (2013.01); *H04L 67/42* (2013.01)

(58) Field of Classification Search
None
See application file for complete search history.

(56) References Cited

U.S. PATENT DOCUMENTS

| 6,052,319 A | * | 4/2000 | Jacobs | G06F 11/006 324/762.02 |
| 6,751,794 B1 | * | 6/2004 | McCaleb | G06F 8/65 707/999.202 |

(Continued)

OTHER PUBLICATIONS

G. Taylor, "Artificial Intelligence Powers Product Recommendations for the North Face", Retail Touchpoints, www.retailtouchpoints.com, Dec. 31, 2015, pp. 1-5.

(Continued)

*Primary Examiner* — Backhean Tiv
(74) *Attorney, Agent, or Firm* — Law Office of Jim Boice

(57) ABSTRACT

An intermediary server receives a resource request from a client computer for a requested resource that has a desired resource ability to optimize the client computer. The intermediary server identifies an alternative resource that has the desired resource ability to optimize the client computer, and determines that an ability of the alternative resource to provide the desired resource ability exceeds an ability of the requested resource to provide the desired resource ability. In response to determining that the ability of the alternative resource to provide the desired resource ability exceeds the ability of the requested resource to provide the desired resource ability, the intermediary server instructs a resource server to send the alternative resource instead of the requested resource to the client computer.

16 Claims, 5 Drawing Sheets

(51) Int. Cl.
*G06F 8/61* (2018.01)
*G06F 8/65* (2018.01)
*H04L 29/08* (2006.01)
*G06F 9/50* (2006.01)

(56) References Cited

U.S. PATENT DOCUMENTS

| | | | | |
|---|---|---|---|---|
| 7,216,343 | B2* | 5/2007 | Das | G06F 8/65 717/168 |
| 7,620,948 | B1* | 11/2009 | Rowe | G06F 8/65 717/171 |
| 7,966,282 | B2* | 6/2011 | Pinckney | G06N 20/00 706/62 |
| 7,979,457 | B1* | 7/2011 | Garman | G06Q 30/0625 707/768 |
| 8,086,590 | B2* | 12/2011 | Zheng | G06Q 30/06 707/706 |
| 8,108,836 | B1* | 1/2012 | Campbell | G06F 8/65 717/120 |
| 8,214,653 | B1* | 7/2012 | Marr | G06F 8/65 713/189 |
| 8,595,714 | B1* | 11/2013 | Hamer | G06F 8/65 717/170 |
| 8,887,144 | B1* | 11/2014 | Marr | H04L 41/082 717/168 |
| 8,971,538 | B1* | 3/2015 | Marr | G06F 8/65 380/285 |
| 9,213,535 | B1* | 12/2015 | Buck | G06F 8/65 |
| 9,408,037 | B1* | 8/2016 | Alizadeh-Shabdiz | H04W 4/029 |
| 9,495,133 | B1* | 11/2016 | Righi | G06F 8/30 |
| 10,083,213 | B1* | 9/2018 | Podgorny | G06F 16/3329 |
| 10,373,081 | B2* | 8/2019 | Crawford | G06Q 10/06312 |
| 10,735,348 | B2* | 8/2020 | Aharonov | G06F 9/5044 |
| 2002/0112230 | A1* | 8/2002 | Scott | G06F 8/65 717/169 |
| 2003/0033313 | A1* | 2/2003 | Zweifel | G06F 8/61 |
| 2003/0041130 | A1* | 2/2003 | Harrisville-Wolff | H04L 67/16 709/221 |
| 2003/0093496 | A1* | 5/2003 | O'Connor | H04L 67/16 709/217 |
| 2003/0120913 | A1* | 6/2003 | Wu | G06F 8/65 713/100 |
| 2003/0220984 | A1* | 11/2003 | Jones | H04L 67/16 709/219 |
| 2004/0060044 | A1* | 3/2004 | Das | G06F 11/3672 717/171 |
| 2004/0123283 | A1* | 6/2004 | Brown | G06F 8/65 717/171 |
| 2004/0148385 | A1* | 7/2004 | Srinivasan | H04L 41/0253 709/224 |
| 2005/0010916 | A1* | 1/2005 | Hagen | G06F 8/65 717/170 |
| 2005/0033871 | A1* | 2/2005 | Beg | G06F 11/3409 710/15 |
| 2005/0132348 | A1* | 6/2005 | Meulemans | G06F 8/65 717/168 |
| 2005/0210459 | A1* | 9/2005 | Henderson | G06F 8/65 717/168 |
| 2005/0229173 | A1* | 10/2005 | Mihm | G06F 8/65 717/171 |
| 2006/0026415 | A1* | 2/2006 | Chen | G06F 8/65 713/2 |
| 2006/0101457 | A1* | 5/2006 | Zweifel | G06F 8/71 717/174 |
| 2006/0106806 | A1* | 5/2006 | Sperling | G06F 21/57 |
| 2007/0050762 | A1* | 3/2007 | Chen | G06F 8/71 717/169 |
| 2007/0106978 | A1* | 5/2007 | Felts | G06F 8/71 717/124 |
| 2008/0235703 | A1* | 9/2008 | Crawford | G06Q 10/04 718/104 |
| 2009/0198769 | A1* | 8/2009 | Keller | G06F 9/44536 709/203 |
| 2009/0222811 | A1* | 9/2009 | Faus | G06F 8/65 717/173 |
| 2009/0328023 | A1* | 12/2009 | Bestland | G06F 8/65 717/168 |
| 2010/0131193 | A1* | 5/2010 | Shnyr | G01C 21/32 701/532 |
| 2011/0225128 | A1* | 9/2011 | Jarrett | G06F 8/71 707/692 |
| 2012/0262754 | A1* | 10/2012 | Hwang | H04N 1/00228 358/1.15 |
| 2012/0311153 | A1* | 12/2012 | Morgan | G06F 11/3006 709/226 |
| 2013/0047145 | A1* | 2/2013 | Cui | G06F 8/658 717/168 |
| 2014/0149582 | A1* | 5/2014 | Chien | H04L 67/303 709/224 |
| 2014/0189337 | A1* | 7/2014 | Lin | G06F 9/4418 713/2 |
| 2014/0282413 | A1* | 9/2014 | Grimme | G06F 8/60 717/124 |
| 2014/0325498 | A1* | 10/2014 | Sirois | G06F 8/65 717/170 |
| 2015/0046281 | A1* | 2/2015 | Shivaswamy | G06Q 30/0631 705/26.7 |
| 2015/0067171 | A1* | 3/2015 | Yum | H04L 67/2809 709/226 |
| 2015/0199197 | A1* | 7/2015 | Maes | G06F 11/3672 717/122 |
| 2015/0304417 | A1* | 10/2015 | Tan | H04L 67/1095 707/610 |
| 2015/0365350 | A1* | 12/2015 | Xu | H04L 47/822 709/226 |
| 2016/0011925 | A1* | 1/2016 | Kulkarni | G06F 11/3006 714/57 |
| 2016/0100091 | A1* | 4/2016 | Curiel Montoya | G06F 3/04842 348/82 |
| 2016/0162270 | A1* | 6/2016 | Kumar | G06F 3/0488 717/177 |
| 2016/0234659 | A1* | 8/2016 | Luo | H04W 4/08 |
| 2016/0378545 | A1* | 12/2016 | Ho | G06F 9/46 718/107 |
| 2017/0039058 | A1* | 2/2017 | Zhu | G06F 8/65 |
| 2017/0161386 | A1* | 6/2017 | Mitsui | G06F 16/335 |
| 2017/0171022 | A1* | 6/2017 | Hamer | H04L 43/50 |
| 2017/0277531 | A1* | 9/2017 | McGrath | G06F 9/5083 |
| 2017/0317949 | A1* | 11/2017 | Aharonov | G06F 9/5044 |

OTHER PUBLICATIONS

IBM, "Tradeoff Analytics", IBM, www.ibm.com, 2016, pp. 1-4.
Nuance Communications, Inc., "NINA—The Intelligent Virtual Assistant" Nuance Communications, Inc., Retrieved Apr. 28, 2016, pp. 1-5.
P. Mell et al., "The NIST Definition of Cloud Computing", National Institute of Standards and Technology, Information Technology Laboratory, Sep. 2011, pp. 1-7.
Wikipedia, Patch(computing), pp. 1-8 (Year:2019).
IBM, "list of IBM Patents or Patent Applications Treated as Related", Appendix P, 2020.
Sep. 4, 2019 Final Office Action from parent docket U.S. Appl. No. 15/141,889.
Nov. 5, 2018 Non-final Office Action from parent docket U.S. Appl. No. 15/141,889.

* cited by examiner

PROVIDING AN OPTIMAL RESOURCE TO A CLIENT COMPUTER VIA INTERACTIVE DIALOG

BACKGROUND

The present disclosure relates to the field of computers, and specifically to satisfying a computer need for a resource. More specifically, the present disclosure relates to satisfying a computer with a resource that is identified by an interactive dialogue between a client computer and an intermediary server that may provide the client computer with access to the resource.

When upgrading a computer system using current systems, a user is typically asked to authorize the installation of a new version of software, hardware, etc. For example, a software provider may send the user a message such as "A new version of Application A is available. Do you want to upgrade this application?" If so, then the user will click a button that causes the new application to be downloaded onto the computer system.

However, the computer system may or may not be improved by downloading the new version of the application. That is, the old version may work better, or an alternative application (not the new version of "Application A") may actually be a better choice when optimizing the operation of the computer system. That is, the user may or may not know what the configuration of the computer, version of software being used by the computer, etc. is optimal for a particular computer and, more specifically, the work that the particular computer performs.

Furthermore, there may be several updated versions of the application available to the client computer, including different updates available from various updating sites/sources. As such, the client computer (or user thereof) is unlikely to be aware of such different updates.

Furthermore, even if the client computer (or user thereof) is aware of such different alternatives, it most likely is unable to determine what best meet its needs.

To address these problems, the present invention utilizes an interactive dialog between a computer system (that requested a resource) and an intermediary server, which is able to provide an optimal resource to the computer system based on the results of the interactive dialog. That is, the present invention does not merely filter out resource options based on the responses from the computer system, for instance, a filter system may filter upgrades if the client computer requests upgrades that are faster than X and more reliable than % Y. Rather, the invention can cope with dialog requests such as "I am short on time but I can't tolerate errors". The invention uses these dialog responses to determine what features the computer system (or alternatively, the user of the computer system) actually needs in order to obtain the right resource. Therefore, the present invention allows the server system, which may or may not be an expert system, to engage with the computer system in order to expand the selection phase, thereby including preferences not requested initially by the computer system.

SUMMARY

A method, system, and/or computer program product provides an optimizing resource to a client computer. An intermediary server receives a resource request from a client computer for a requested resource that has a desired resource ability to optimize the client computer. The intermediary server identifies an alternative resource that has the desired resource ability to optimize the client computer, and determines that an ability of the alternative resource to provide the desired resource ability exceeds an ability of the requested resource to provide the desired resource ability. In response to determining that the ability of the alternative resource to provide the desired resource ability exceeds the ability of the requested resource to provide the desired resource ability, the intermediary server instructs a resource server to send the alternative resource instead of the requested resource to the client computer.

Thus, the present invention does not merely filter out different options for providing the resource to the client computer, but determines what features are actually useful to the client computer, and then locates resources that have these features.

In one or more embodiments of the present invention, the method further creates an interactive dialog between the intermediary server and the client computer, where the interactive dialog identifies a desired resource ability of the requested resource, where the interactive dialog is a direct machine-to-machine communication between the intermediary server and the client computer, and where the intermediary server interprets interactive dialog responses from the client computer in order to identify a desired resource ability of the requested resource.

In an embodiment of the present invention, the intermediary server receives a description of how the client computer has used a prior version of the requested resource on a specific type of task, project, job, etc. in order to determine the desired resource ability of the requested resource, and then directs the client computer to use the alternative resource in order to improve operations of the client computer when performing future tasks of the specific type of task. Thus, the intermediary server knows how the client computer used (or alternatively, plans to use) a certain type of resource (e.g., software, hardware) on past tasks, and then locates and installs new components onto the client computer in order to improve the efficiency/operation of the client computer.

In an embodiment of the present invention, the intermediary server determines, based on a positioning device on the client computer or on an electronic device associated with the client computer (e.g., a smart phone that is used by the user of the client computer) a physical location of the client computer, and then directs a resource server to send the resource (that improves the operation of the client computer) to the current location of the client computer. This provides the advantage of sending the new resource directly to the client computer without delay.

DETAILED DESCRIPTION

Figure 1:
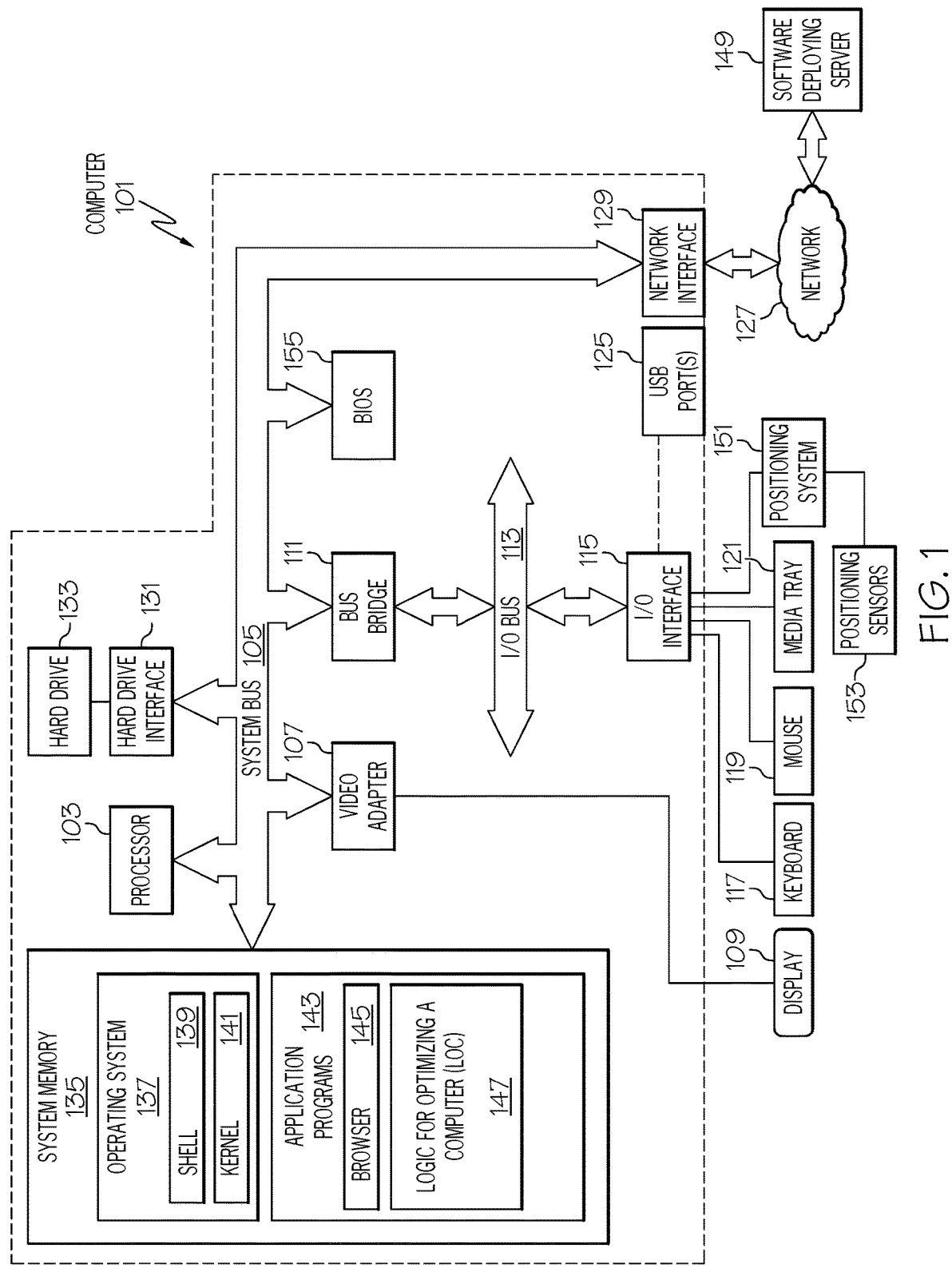
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or client computer 202, intermediary server 204, and/or resource server 206 shown in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101 and/or client computer 202 shown in FIG. 2. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing.

While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Optimizing a Computer (LOC) 147. LOC 147 includes code for implementing the processes described below, including those described in FIGS. 2-3. In one embodiment, computer 101 is able to download LOC 147 from software deploying server 149, including in an on-demand basis. In one embodiment, software deploying server 149 is able to execute one or more instructions from LOC 147 and provide the results to computer 101, thus relieving computer 101 from the need to utilize its internal processing power.

Also coupled to system bus 105 is a basic input/output system (BIOS) 155, which is a chip that is statically loaded with a program that processor 103 uses to start the computer 101, manages data flow between operating system 137 and attached devices such as display 109, keyboard 117, mouse 119, hard drive 133, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention presents a system and method for providing optimizing resources (e.g., software, hardware, configurations, etc.) that will improve the operation of a client computer, particularly for a particular type of job. In a preferred embodiment, the resources are available through an intermediary server, which is able to access the resources that will optimize the client computer. Thus, the client computer interacts with the intermediary server such that the client computer seeks optimization options from the intermediary server, which then provides means for the client computer to decide which options to use. The optimizing resource being sent to the client computer may be a software update, the network services that are available via application program interfaces (API's), hardware, etc. The decision regarding which optimizing resource is received may be made by the client computer, a user of the client computer, or a third party computer (e.g., a supervisory computer).

While the present invention is described in an embodiment in which an intermediary server and the client computer negotiate which optimizing resource is to be provided to the client computer, the present invention is also applicable in an autonomous manner, in which the client computer corresponds with the intermediary server (or directly with the resource).

Figure 2:
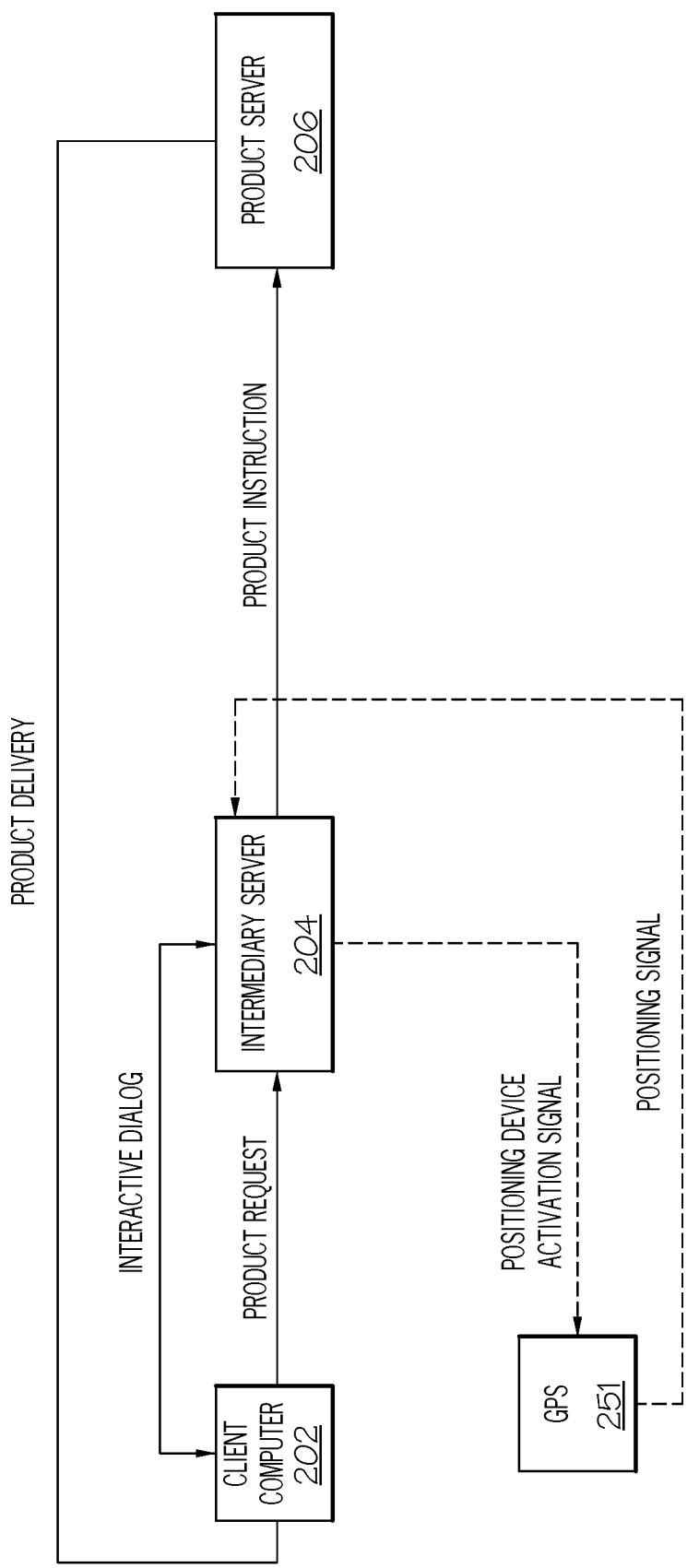
FIG. 2 depicts a simplified outline of a relationship between a client computer (which is to be optimized by a resource), an intermediary server, and a resource server that provides the resource.

With reference now to FIG. 2, a simplified outline of a relationship between a client computer 202 (which is to be optimized by a resource), an intermediary server 204, and a resource server 206 that provides the resource to the client computer 202 is presented. Note that the use of the term "server" when naming intermediary server 204 and resource server 206 and the use of the term "client" when naming client computer 202 is not to be interpreted as a master/slave relationship in which a server controls all operations of a client computer.

Assume that client computer 202 sends a resource request to the intermediary server 204. This resource request may be for a software upgrade, a hardware upgrade, etc. to the client computer 202. In a preferred embodiment, this resource request is automatically generated according to the steps described in detail below. That is, the client computer 202 "knows" that it needs an upgrade, but does not "know" what resource(s) will best provide this upgrade. The present invention allows the client computer 202 and the intermediary server 204 to engage in an interactive dialog, such that the intermediate server 204 can send a resource instruction to the resource server 206, directing the resource server 206 to deliver the upgrade/resource to the client computer 202.

In an embodiment of the present invention, the intermediary server 204 is able to query a positioning device such as the depicted global positioning system (GPS) 251 (analogous to the positioning system 151 shown in FIG. 1) to determine the geophysical location of the client computer 202. GPS 251 may be a component of client computer 202 or a component of another electronic device (e.g., a smart phone held by a user of the client computer 202).

Figure 3:
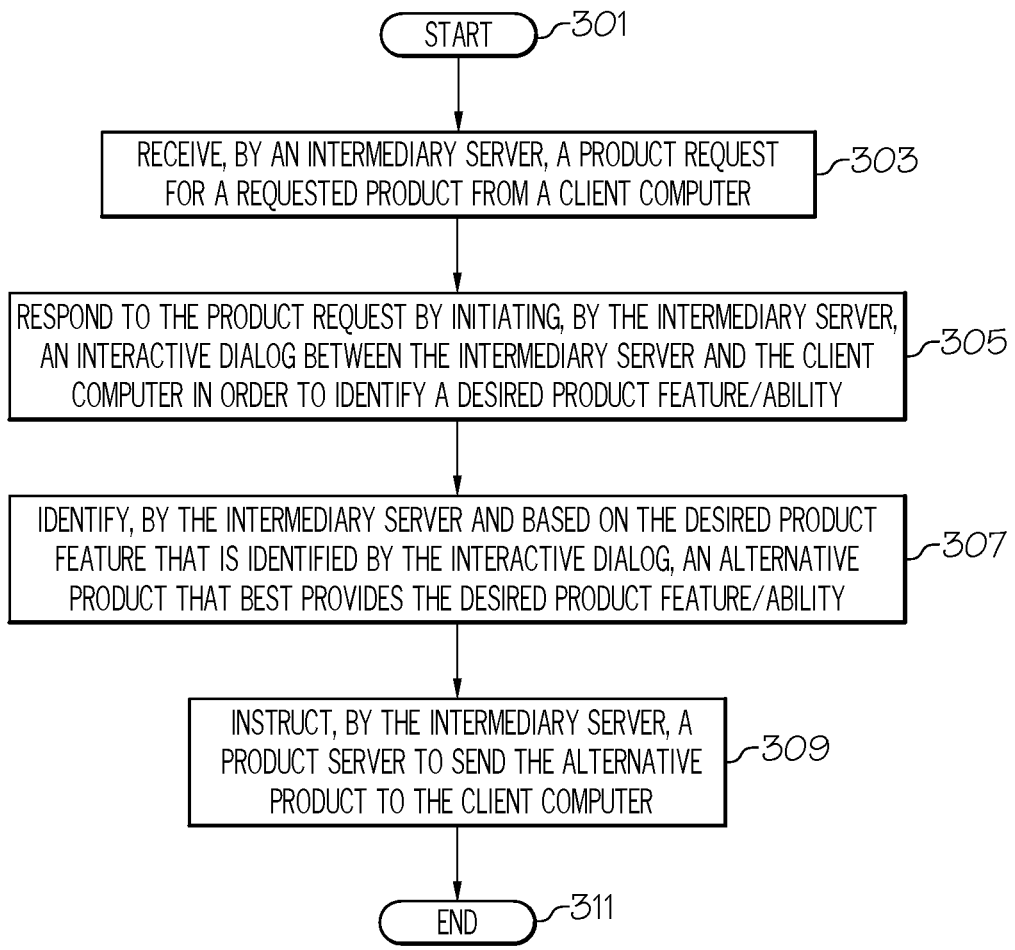
FIG. 3 is a high-level flow chart of one or more steps performed by one or more computing and/or other hardware devices to satisfy a client computer request for a resource in accordance with one or more embodiments of the present invention.

With reference now to FIG. 3, a high-level flow chart of one or more steps performed by one or more computing and/or other hardware devices to optimize a client computer in accordance with one or more embodiments of the present invention is presented.

After initiator block 301, an intermediary server (e.g., intermediary server 204 shown in FIG. 2) receives a resource request for a requested resource from a client computer (e.g., client computer 202 shown in FIG. 2), as described in block 303.

In a preferred embodiment, this request is automatically generated by client computer 202, and the requested resource is an upgrade/modification to client computer 202.

For example, assume that client computer 202 has a record of performing a certain type of job, such as monitoring and controlling equipment (e.g., pumps, actuators that open and close valves, heaters, etc.) in a petrochemical plant. Assume further that client computer 202 uses operating system (OS) A, which is booted up by basic input/output system (BIOS) A, and uses Application A to monitor and control this equipment. Assume further that the client computer 202 is requesting another copy of OS A and/or another copy of BIOS A and/or another copy of Application A. For example, client computer 202 may have had its hard drive (e.g., hard drive 133 shown in FIG. 1) and/or its BIOS chip (e.g., BIOS 155 shown in FIG. 1) replaced, and therefore needs to reload the BIOS A firmware into the BIOS chip and/or O/S A and or Application A into the hard drive and/or system memory.

However, the intermediary server 204 may determine, based on the interactive dialog described below and/or a history of use of the client computer 202 and/or a profile of the client computer, that BIOS A and/or OS A and/or Application A are not the best, or even proper software to use when monitoring equipment in a petrochemical plant. For example, Application A may be an application that was designed to monitor sales transactions in a retail store, and has been awkwardly modified to monitor plant equipment.

Similarly, BIOS A may give priority to the processor receiving inputs from a point of sale (POS) terminal or a local keyboard, rather than giving priority to receiving inputs from a device sensor in the petrochemical plant (which is mission critical for avoiding catastrophic events). Similarly, OS A may be best suited to handling word processing programs, rather than monitoring equipment.

Thus, when the intermediary server 204 establishes an interactive dialog with the client computer (e.g., by extracting history logs of operations performed by the client computer, a list of equipment used by and/or monitored by the client computer, etc.), the intermediary server 204 may determine through an interactive dialog that O/S B and/or BIOS B and/or Application B is better suited to the operations performed by client computer 202. As such, in one embodiment the intermediary server 204 will send O/S B and/or BIOS B and/or Application B to client computer 202 along with electronic instructions to automatically upgrade client computer 202 with O/S B and/or BIOS B and/or Application B, thus improving the operation of client computer 202.

In a preferred embodiment of the present invention, the intermediary server 204 is preloaded with multiple alternative resources that are available to the client computer 202.

With reference now to block 305 in FIG. 3, the intermediary server responds to the resource request by initiating an interactive dialog between the intermediary server and the client computer. This interactive dialog identifies a desired resource ability/feature of the requested resource through the use of an interactive exchange that interprets interactive dialog responses from the client computer in order to identify the desired resource ability/feature. This interactive exchange goes beyond a simple filtering exchange.

That is, the intermediary server does not simply filter the responses such that certain responses are matched to certain resources. For example, if the client computer indicated that it wanted an updated version of its current BIOS that costs less than a certain amount of money, then a filtering system would simply locate a BIOS that is based on the current BIOS and costs less than that certain amount of money. The present invention does not use such a simplistic filtering approach. Rather, the interactive dialog determines what feature(s) are actually needed in software and/or hardware by the client computer, even if the client computer's logic is not aware of such needs (used to optimize the operations of the client computer). That is, the interactive dialogue allows the intermediary server to determine what the client computer actually needs, not just what the client computer has requested.

For example, in the prior art, a filtering system would simply receive a request for a particular piece of software or hardware. The requests may contain specific constraints (such as no more than 200 MB on size). The filtering system would then either return the requested software/hardware or find a similar alternative, without determining what the actual needs of the client computer are for a particular type of job.

The present invention, however, uses the interactive dialog to determine the needs and preferences of the client computer, for instance, what type of task(s) the client computer is performing, and then supplies it with the appropriate type of software and/or hardware.

As described above, this interactive dialog may be purely hardware-to-hardware, such that the intermediary server electronically interrogates history registers, component registers, performance dashboards, etc. of a client computer in order to determine what resource (software/hardware upgrade, service API, etc.) is best suited for that client computer to perform a certain type of task, thereby improving the performance of the client computer.

While in a preferred embodiment of the present invention the resource being requested to improve the function of the client computer is software, in an embodiment of the present invention the resource is hardware. Thus, the intermediary server, upon determining (based on the interactive dialog with the client computer) which new piece of hardware is optimal will send an instruction to a hardware supplier (e.g., via the resource server 206 shown in FIG. 2) to ship that new piece of hardware to the location of the client computer 202 (or at least to a servicing entity that maintains the client computer 202).

Returning now to FIG. 3, the intermediary server, based on the desired resource ability that is identified by the interactive dialog, identifies an alternative resource that best provides the desired resource ability, as described in block 307. In a preferred embodiment of the present invention, the requested resource and the alternative resource are of a same type of resource.

For example, the requested resource may be an upgrade to BIOS A and the alternative resource may be BIOS B, but the requested resource and the alternative resource are both BIOSes. However, BIOS A may be designed such that a certain device (e.g., a monitor) is called up first, while BIOS B may be designed such that a certain input device (e.g., a port connecting the client computer to a remote sensor) is called up first. Assume now that the intermediary server determines (based on resource usage, a record of past jobs/instructions, calls to retrieve data from the remote server, etc.) that client computer needs to retrieve sensor data from the remote sensor before doing anything else, since that data will determine whether or not the monitor will even need to be turn on. That is, depending on the sensor data that is received, the client computer may function as an autonomous controller that does not display its activity at all. As such, even though the client computer requested an upgrade to BIOS A, the intermediary server will determine that the different BIOS B is a better fit for the type of work that the client computer is performing, and "overrides" the request for the upgrade to BIOS A and sends BIOS B to the client computer instead, thus improving the operation of the client computer.

As used herein, the term "alternative resource" is defined as a version of the "requested resource" that may be the same as or different from the "requested resource". Nonetheless, the alternative resource and the requested resource are a same type of resource. For example, the requested resource may be a word processing program (Resource A), and the alternative resource may be a different word processing program (Resource B), but Resource A and Resource B are both word processing programs. However, Resource B is deemed superior for a particular type of task being performed by the client computer, and thus the intermediary server provides Resource B (the alternative resource) rather than the requested resource (Resource A) to the client computer.

However, in another embodiment, the alternative resource (Resource B) and the requested resource (Resource A) are the exact same resource, assuming that the requested resource is in fact the optimal resource for performing a particular type of job on the client computer (as ascertained by the invention described herein).

As described in block 309, in response to identifying the alternative resource, the intermediary server instructs a resource server (e.g., resource server 206 shown in FIG. 2) to send the alternative resource to the client computer, thereby improving the function of the client computer 202 when the alternative resource is installed.

The flow-chart ends at terminator block 311.

As described herein, the interactive dialog between the client computer 202 and the intermediary server 204 identifies the desired resource ability without filtering out candidate versions of the resource. That is, the interactive dialog does not merely filter out candidate resources based on user-input constraints. For example, in the prior art, a user could tell the intermediary server 204 "I want an OS that costs less than $200 US". The intermediary server 204 would then simply filter out any OS that costs more than $200 US, and offer to send the user one of the cheaper (less than $200 US) OSes. However, the present does not rely on performing such filtering. Rather, the present invention engages in the interactive dialog in order to determine what abilities/features are needed for that particular client computer to perform a certain type of operation(s). For example, it might be that there are no OSes that fit the needs of the client computer for less than $200 US.

In an embodiment of the present invention, the intermediary server receives a description of how the client computer has used a prior version of the requested resource on a specific type of task in order to determine the desired resource ability of the requested resource. The intermediary server uses this description in the interactive dialog to direct the client computer to install an alternative resource in order to improve operations of the client computer when performing future tasks of the specific type of task. Thus, and as described above, the intermediary server may interrogate registers in the client computer that describe what types of tasks are performed by the client computer, when and where such tasks take place, etc. Alternatively, this information may be obtained in a question and answer (Q&A) format. That is, the intermediary server may generate natural language queries (e.g., using a natural language program—NLP) about the activities of the client computer. The client computer can then respond with NLP-generated textual responses, or the responses may be manually entered by a user of the client computer.

For example, if the intermediary server asks the client computer "What kind of work do you do?", the client computer can respond with an NLP-generated or user-generated reply "This computer monitors equipment in a petrochemical plant." Based on this reply, the intermediary server may respond with "What kind of equipment?", to which the client computer could respond with "Pumps". Additional questions (e.g., "Does the computer monitor 24/7?"; "Is the computer exposed to caustic materials?"; "Will the computer be doing the same type of monitoring that it has performed for the past year?"; etc.) will then further determine what software/hardware upgrades/changes best optimize the performance of the computer.

In an embodiment of the present invention, the intermediary server receives a description of how the client computer plans to use the requested resource on a specific type of task in order to determine the desired resource ability of the requested resource, and then enables a directive to the client computer to install the alternative resource in order to improve operations of the client computer when performing future tasks of the specific type of task. That is, during the interactive dialog between the client computer and the intermediary server, the client computer provides data (e.g., from pending tasks in the client computer) or answers (e.g., provided by the user via the client computer in response to questions from the intermediary server) describing planned tasks that the client computer will be performing. For example, the intermediary server may ask a user of the client computer, during the interactive dialog, "What type of tasks will the client computer be performing next month?" The user may respond with "The client computer will be monitoring heaters in the plant." By interpreting this answer with a natural language programming/processing (NLP) based logic, the intermediary server will determine that another type of BIOS is better suited for receiving readings from temperature sensors, and will send that BIOS to the client computer for installation into the BIOS chip (assuming that the BIOS chip is dynamically programmable) on the client computer.

In an embodiment of the present invention, the intermediary server receives a description in the form of a table indicating that the requested resource has different possible resources alternatives and their characteristics. The intermediary server uses this description to determine the best desired resource ability of the requested resource, and then enables a directive to the client computer to install the alternative resource in order to improve operations of the client computer when performing future tasks of the specific type of task. More specifically as part of the interactive dialog, the intermediary server uses this table alongside the natural language description of the needs to determine the best alternative resource. More specifically the intermediary server uses decision analytics, such as tradeoff analytics to determine the best resource.

In an embodiment of the present invention, the requested resource is a software component for the client computer. As such, the intermediary server will, in one or more embodiments of the present invention, transmit instructions to the resource server to transmit software installation instructions to the client computer. These software installation instructions, when received by the client computer, cause the client computer to automatically install the software component on the client computer, thus improving operations of the client computer when performing future operations.

Examples of such software updates/improvements/changes include, but are not limited to a new BIOS, a new operating system, and/or a new application for the client computer, as described herein.

In one or more embodiments of the present invention, the upgraded component for the client computer (as ascertained from the interactive dialog between the intermediary server and the client computer) is a hardware device (e.g., a new hard drive, more memory, a new sensor interface card, etc.). In this embodiment, the intermediary server transmits shipping instructions to the resource server, directing the resource server to issue instructions to ship the hardware component to the client computer (or alternatively to an entity that services the client computer), such that installing the hardware component improves an operation of the client computer.

In an embodiment of the present invention, the intermediary server directs the resource server to send the alternative resource (i.e., the upgrade software/hardware) directly to a location that is determined by a positioning activation signal (e.g., the GPS 251 system shown in FIG. 2) received from the client computer 202 or another device (e.g., a smart phone) associated with the client computer and/or a user of the client computer. This positioning activation signal may describe a geophysical location (e.g., by using the GPS 251) or a network address (e.g., based on an IP address of the client computer 202). Thus, in this embodiment the intermediary server sends a positioning device activation signal to a positioning device within an electronic device associated with the client computer. This positioning activation signal activates the positioning device, which was turned off beforehand. The intermediary server is then able to receive a positioning signal from the positioning device that identifies a real-time physical location of the client computer. In response to the intermediary server receiving the positioning signal from the positioning device, the intermediary server then transmits a resource transmission instruction to the resource server. This resource transmission instruction instructs the resource server to send the alternative resource directly to the client computer. In a preferred embodiment, the resource transmission instruction includes the positioning signal received from the GPS, a description of the alternative resource (as derived from the interactive dialog), a network address of the client computer (obtained by "pinging" the client computer for its IP address), and a directive for the resource server to directly send the alternative resource to the client computer.

In an embodiment of the present invention, the intermediary server utilizes a known profile of the client computer to interpret responses from the client computer during the interactive dialog in order to identify the resource ability that is desired by the client computer. For example, if a parts register shows that the client computer is connected to a vibration sensor that generates sensor readings that describe the level of vibration in a rotating pump, then the client computer needs a resource (software or hardware) installed on the client computer that is able to receive (e.g., a sensor port, a BIOS, etc. that enable the client computer in receiving sensor readings) and interpret (e.g., an application that is designed to interpret, respond to, display, and otherwise interpret and utilize the sensor readings) the sensor readings.

In an embodiment of the present invention, the responses from the client computer are input by a person who will be using the requested resource, where the person desires the resource ability in the requested resource. That is, as described above, the user of the client computer engages with the intermediary server via the interactive dialog. The intermediary server may utilize a known profile of the person to interpret responses from the person during the interactive dialog in order to identify the resource ability that is desired by the person. For example, assume that a user profile of the person (as found in a database within the client computer, the intermediary server, or any other computer) shows that the person who is answering questions and/or prompts from the intermediary server during the interactive dialog shows that this person is a mechanical engineer. Thus, the intermediary server will interpret responses from this person accordingly to this person's occupation. For example, if the person who is responding to questions from the intermediary server states that the client computer needs a resource (e.g., an application) that has the desired resource ability of "monitoring a plant", then the intermediary server will interpret this as the client computer needing the ability to monitor equipment in a processing/manufacturing facility ("plant"), and not the ability to monitor a biological entity ("plant").

In an embodiment of the present invention, the resource request is for a first resource, and the alternative version of the resource is a second resource that is different from the first resource. That is, the intermediary server will recommend a different resource than the one requested by the client computer (based on the results of the interactive dialog). However, in another embodiment, the requested resource and the alternative resource are a same resource. That is, after concluding the interactive dialog with the client computer, the intermediary server may conclude that the initially requested resource is in fact the optimal choice for meeting the needs/requirements of the client computer to perform a certain type of task (e.g., monitoring equipment in a petrochemical plant).

With reference again to FIG. 2, note that the intermediary server 204 and the resource server 206 discussed herein are depicted as two different servers. However, in an embodiment of the present invention the intermediary server 204 and the resource server 206 are a same server. That is, in this embodiment, the intermediary server 204 is not only able to interpret the interactive dialog in order to determine which resource to be installed on the client computer 202 is optimal, but is also able to supply (e.g., download, deliver) the client computer 202 with the optimal resource/resource.

In an embodiment of the present invention, the intermediary server 204 is preloaded with available pathways to optimizing resources. That is, intermediary server 204 is preloaded with multiple portals, connections, interfaces, etc. with resources from one or more resource providers (e.g., resource server 206). These resources are options that respond to certain client computer generated criteria. That is, client computer 202 (and/or the user of client computer 202) is able to set criteria such as a duration of an upgrade, a reliability of the upgrade, other users' experience with the upgrade, a popularity (rating) of the upgrade, etc. For example, the client computer 202 is able to set multiple resource preferences for software that runs on a certain operating system (the client computer has an ordered preference of OS), has the best approval rating from other users, and can run as fast as possible on a laptop computer.

In an embodiment of the present invention, the intermediary server 204 is trained to identify criteria in incoming requests. For example, assume that the client computer 202 requests: "I need a software upgrade that is reliable but with a history of great user experience and good reviews". This request may be input by a user of the client computer 202, or may be auto-generated by NPL logic within the client computer 202 that recognizes past resource usage by the client computer 202 and problems encountered when using these resources. The intermediary server 204 will recognize the features outlined in the request, and will locate an available resource that best meets the criteria in the request.

Such criteria often result in a tradeoff between the different criterions. The intermediary server through an interactive dialog determines the best tradeoff for the client computer thus determining which resource to be installed on the client computer 202 is optimal.

As such, the intermediary server 204 takes the client computer 202 through a decision process that would yield best software upgrades to the client computer 202. The definition of "best software upgrades" is not just the options the best match the client computer request but rather options that best satisfy the client computer at the end of the process. That is, the intermediary server 204 does not respond in a reactive manner, but rather proactively determine what the client computer 202 actually needs (rather than just responding to what the client computer 202 has requested). This minimizes wasted time, wasted cost, and in the case of hardware, wasted materials by the client computer, and reduces the necessity of requesting the resource more than once. To be able to do so, the intermediary server 204 may expand the initial requests to more criteria based on its understanding of the domain or its new findings about the computer client needs as the conversation progresses.

The intermediary server 204's ability to understand the client computer 202's intent may be "off-track" or "in-track". If the client computer 202 initiates a new request while ignoring responses from the intermediary server 204, this is known as an "off-track" request. For example, the client computer 202 may ask for a new/upgraded resource, information on a requested resource, and/or information on an alternative resource offered by the intermediary server. The intermediary server 204 then only responds to the requests and questions of the client computer 202. If the client computer 202 sends the intermediary server 204 a subsequent request that matches the previous response from the intermediary server (e.g., "I want a resource that will cause me to run more efficiently," upon a previous response of "What type of resource are you interested in?"), then this is known as an "in-track" request.

However, an "off-track" request may be directly related to the domain of the client computer 202. For instance, the resource request from the client computer 202 to the intermediary server 204 may be "What software updates do you recommend?" or "What about the software upgrade of feature X to Version Z?". Such requests are answered by the intermediary server 204 based on decision analytics on these software updates, as described below.

Another type of "off-track" request may ask informative questions that are equivalent to queries using a structured query language such as SQL. For example, a resource request/query such as "What are the most recent software updates?" is an "off-track" request that asks a specific about a resource.

Such "off-track" requests are not only answered by the intermediary server 204, but are also processed as "preferences hints" that may affect the selection of alternative resources offered to the client computer 202 during subsequent conversations, based on the confidence in those hints.

"In-Track" requests are more intuitively based than "off-track" requests. That is, the client computer 202 answers specific questions from the intermediary server (such as expressing its preferences) in a natural language that is open to interpretation by the intermediary server 204.

The intermediary server 204 needs to extract from the natural language the computer client preferences. So, if client computer 202 requests: "I need a software upgrade that is reliable but with great user experience and has received good reviews", this would be understood as a request for a software application that has high reliability, a track record of reports of positive user experience, and is popular with users.

The intermediary server 204 also understands categorical values and determines whether to ask the client computer 202 for its order of preference in those values based on the conversation context and prior knowledge. For instance, the client computer 202 may ask: "To save network bandwidth I prefer a compressed software update but I need it as fast as possible". The intermediary server 204 understands that the client computer 202 is requesting a software compression resource and it wants the update as soon as possible. However, the intermediary server 204 initially doesn't know which compression method is preferable for the client computer. It maybe that the client computer prefers one compression product over another compression product. The intermediary server 204 will thus identify that the criterion requested is categorical and will engage with the client computer 202 to determine the preference as needed.

The client computer 202 may express certain constraints in its requests, such as "I want only certified software updates".

Thereafter, however, the intermediary server 204 may decide to ask the client computer 202 to expand its preferences to other criteria based on knowledge (held by the intermediary server 204) on computers such as client computer 202 (i.e., their processing power, what types of jobs they do, etc.).

The intermediary server 204 can then offer the client computer other options (e.g., software updates) that would minimize wasted resources of the client computer. For instance, the intermediary server 204 may locate a software update that fully meets the stated requirements of the client computer 202 as found in the resource request. However, the intermediary server 204 may have a record of problems with the requested resource (e.g., susceptibility to security breaches) and thus, the requested resource does not meet important criteria that client computer 202 did not consider in its initial request and dialog. As such, the intermediary server 204 may select a software update that is "good enough" for the needs of the client computer 202, and yet provides excellent protection from security breaches (hacking).

Based on the preferences denoted by the client computer 202, the intermediary server 204 offers the client computer 202 a set of options (e.g., software updates) that best meet those preferences utilizing tradeoff analytics technology. The intermediary server 204 can further discuss these best options (and other options which were not determined by the interactive dialog) in order to determine which option should be selected. The best options represent a tradeoff between the different criterions denoted by the computer client 202. The computer client 202 may ask for further information from the intermediary server 204 until an optimal resource alternative is found.

In an embodiment of the present invention, if the number of options presented to the client computer 202 is too large (e.g., more than some predetermined quantity), the intermediary server 204 may decide to return a sample of those options.

In an embodiment of the present invention, the intermediary server 204 may also respond to a selection of an option by the client computer 202 with a set of similar options based on the preferences important to the client computer 202 and other criteria, which may be set by the intermediary server 204 (e.g., availability of the resource) or by the client computer 202 (e.g., the cost of the resource).

Further information may be dynamically elicited from intermediary server 204 in the form of a question such as "Intermediary Server, why have you excluded this option?" or "What do you think of this option?" The intermediary server 204 will then respond in natural language to explain the benefits or detriments of the particular options, based on analytics performed by the intermediary server 204.

The client computer 202 may further request that the intermediary server 204 compare several options in order to better understand their differences and enable a better decision (regarding which resource is sent to the client computer 202).

Thus, as described herein, the decision of which resource is supplied to the client computer 202 is determined by the intermediary server 204 based on the context of the client computer conversation (interactive dialog) and historical conversations (interactive dialogs) between the client computer 202 and the intermediary server 204 in this domain.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
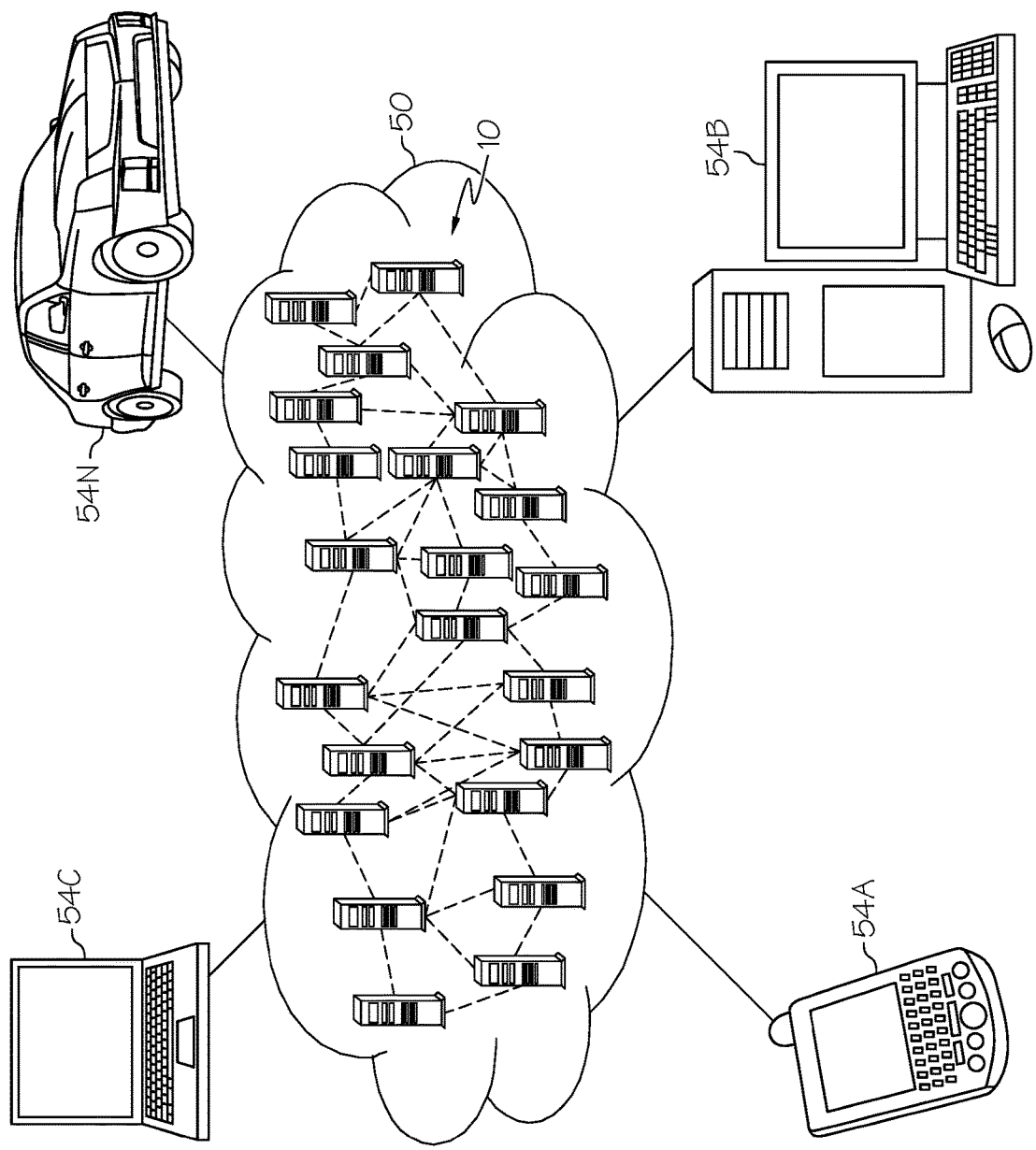
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
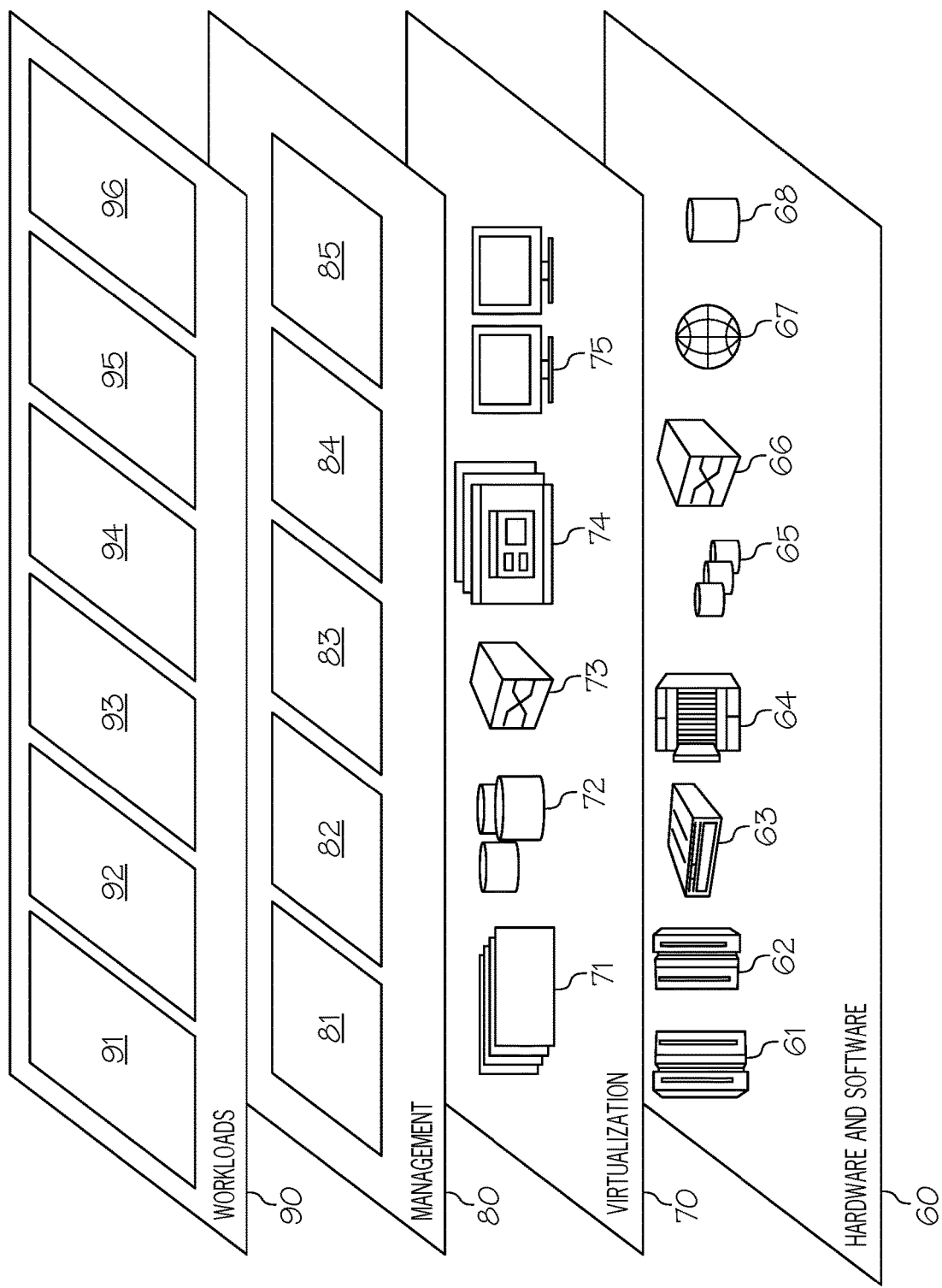
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer optimization processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by an intermediary server, a resource request from a client computer for a requested resource that has a desired resource ability to optimize the client computer;
    identifying, by the intermediary server, an alternative resource that has the desired resource ability to optimize the client computer, wherein the requested resource and the alternative resource are of a same type of resource, wherein the requested resource and the alternative resource are different resources that have different abilities, and wherein the requested resource and the alternative resource first affect different components of the client computer when utilized by the client computer;
    determining, by the intermediary server, that an ability of the alternative resource to provide the desired resource ability exceeds an ability of the requested resource to provide the desired resource ability; and
    in response to determining that the ability of the alternative resource to provide the desired resource ability exceeds the ability of the requested resource to provide the desired resource ability, instructing, by the intermediary server, a resource server to send the alternative resource instead of the requested resource to the client computer.

2. The method of claim 1, further comprising:
    creating an interactive dialog between the intermediary server and the client computer, wherein the interactive dialog identifies the desired resource ability of the requested resource, wherein the interactive dialog is a direct machine-to-machine communication between the intermediary server and the client computer, and wherein the intermediary server interprets interactive dialog responses from the client computer in order to identify the desired resource ability of the requested resource.

3. The method of claim 2, wherein the interactive dialog identifies the desired resource ability without relying on constraint based filtering to determine candidate versions of an offered resource to be implemented as the alternative resource.

4. The method of claim 1, further comprising:
    receiving, by the intermediary server, a description of how the client computer has used a prior version of the requested resource on a specific type of project in order to determine the desired resource ability of the requested resource; and
    directing, via the intermediary server, the client computer to install the alternative resource in order to improve operations of the client computer when performing future projects of the specific type of project.

5. The method of claim 1, further comprising:
    receiving, by the intermediary server, a description of a specific type of activity for which the client computer plans to use the requested resource in order to determine the desired resource ability of the requested resource; and
    directing, via the intermediary server, the client computer to use the alternative resource in order to satisfy the client computer when performing a future activity of the specific type of activity related to the requested resource.

6. The method of claim 1, wherein the alternative resource is alternative software, and wherein the method further comprises:
    transmitting, from the intermediary server, instructions to the resource server to transmit software installation instructions to the client computer, wherein the software installation instructions, when received by the client computer, cause the client computer to automatically install the alternative software on the client computer in order to improve operations of the client computer when performing future operations.

7. The method of claim 6, wherein the alternative software is a new BIOS for the client computer.

8. The method of claim 6, wherein the alternative software is a new operating system for the client computer.

9. The method of claim 1, further comprising:
    receiving, by the intermediary server, a table indicating that the requested resource has different possible resource alternatives and characteristics of the different possible resource alternatives;
    determining, by the intermediary server, through an interactive dialog, a best desired resource ability of the requested resource, wherein the best desired resource ability is based on predefined features established for the client computer, and wherein the intermediary server uses tradeoff analytics to determine a best resource for the alternative resource based on the best desired resource ability of the requested resource;
    selecting, by the intermediary server, the alternative resource that has the best desired resource ability as determined by the intermediary server; and
    issuing, by the intermediary server, a directive to the client computer to use the alternative resource in order to improve operations of the client computer when performing future tasks of a specific type of task.

10. The method of claim 1, wherein the requested resource is a hardware component of the client computer, wherein the alternative resource is an alternative hardware component for the client computer, and wherein the method further comprises:
    transmitting, from the intermediary server, shipping instructions to the resource server to ship the alternative hardware component to the client computer for installation, wherein installing the alternative hardware component improves an operation of the client computer.

11. The method of claim 1, further comprising:
    sending a positioning device activation signal from the intermediary server to a positioning device within an electronic device associated with the client computer, wherein the positioning activation signal activates the positioning device;
    receiving, by the intermediary server, a positioning signal from the positioning device that identifies a real-time physical location of the client computer; and
    in response to the intermediary server receiving the positioning signal from the positioning device, transmitting, from the intermediary server, a resource transmission instruction to the resource server, wherein the resource transmission instruction instructs the resource server to send the alternative resource directly to the client computer, wherein the resource transmission instruction comprises the positioning signal, a description of the alternative resource, a network address of the client computer, and a directive for the resource server to directly send the alternative resource to the client computer.

12. The method of claim 1, further comprising:
creating an interactive dialog between the intermediary server and the client computer, wherein the interactive dialog identifies the desired resource ability of the requested resource; and
utilizing, by the intermediary server, a known profile of the client computer to interpret interactive dialog responses from the client computer during the interactive dialog in order to identify the desired resource ability of the requested resource.

13. The method of claim 1, wherein the resource request is processed as either an "off-track" request or an "in-track" request by the intermediary server, wherein the "off-track" request occurs when the client computer requests the requested resource while ignoring any inquiries from the intermediary server such that the requested resource is returned to the client computer, and wherein the "in-track" request allows the intermediary server to recommend the alternative resource based on responses from the client computer during an interactive dialog, between the intermediary server and the client computer, that identifies the desired resource ability of the requested resource.

14. The method of claim 1, wherein the intermediary server and the resource server are a same server.

15. A method comprising:
receiving, by an intermediary server, a resource request from a client computer for a requested resource that has a desired resource ability to optimize the client computer;
identifying, by the intermediary server, an alternative resource that has the desired resource ability to optimize the client computer;
determining, by the intermediary server, that an ability of the alternative resource to provide the desired resource ability exceeds an ability of the requested resource to provide the desired resource ability;
in response to determining that the ability of the alternative resource to provide the desired resource ability exceeds the ability of the requested resource to provide the desired resource ability, instructing, by the intermediary server, a resource server to send the alternative resource instead of the requested resource to the client computer;
receiving, by the intermediary server, an input by a person who will be using the requested resource, wherein the person desires the desired resource ability in the requested resource, and wherein the input further describes the desired resource ability in the requested resource;
utilizing, by the intermediary server, a known profile of the person to interpret the input from the person in order to identify the desired resource ability that is desired by the person; and
further identifying, by the intermediary server and based on the known profile of the person, the alternative resource that best provides the desired resource ability.

16. A method comprising:
receiving, by an intermediary server, a resource request from a client computer for a requested resource that has a desired resource ability to optimize the client computer;
identifying, by the intermediary server, an alternative resource that has the desired resource ability to optimize the client computer;
determining, by the intermediary server, that an ability of the alternative resource to provide the desired resource ability exceeds an ability of the requested resource to provide the desired resource ability;
in response to determining that the ability of the alternative resource to provide the desired resource ability exceeds the ability of the requested resource to provide the desired resource ability, instructing, by the intermediary server, a resource server to send the alternative resource instead of the requested resource to the client computer;
receiving, by the intermediary server, an input by a person who will be using the requested resource, wherein the person desires the desired resource ability in the requested resource, and wherein the input describes the desired resource ability in the requested resource;
utilizing, by the intermediary server, a known profile of the person to interpret terminology used in the input from the person according to the known profile of the person; and
further identifying, by the intermediary server, the desired resource ability based on an interpretation of the terminology used by the person.

* * * * *